United States Patent
Rangarajan et al.

(10) Patent No.: US 8,411,807 B1
(45) Date of Patent: Apr. 2, 2013

(54) MID-PACKET CLEAR CHANNEL ASSESSMENT

(75) Inventors: Raghuram Rangarajan, Santa Clara, CA (US); Brian Donald Hart, Sunnyvale, CA (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 1118 days.

(21) Appl. No.: 12/202,782

(22) Filed: Sep. 2, 2008

(51) Int. Cl.
    *H03D 1/00* (2006.01)
(52) U.S. Cl. .................. 375/343; 375/340; 375/316
(58) Field of Classification Search .............. 375/343
    See application file for complete search history.

(56) References Cited

U.S. PATENT DOCUMENTS

| | | | | |
|---|---|---|---|---|
| 4,042,923 A | * | 8/1977 | Merrick | ............ 342/42 |
| 5,347,541 A | * | 9/1994 | Iltis et al. | ............ 375/230 |
| 5,566,366 A | * | 10/1996 | Russo et al. | ............ 455/343.5 |
| 6,115,354 A | * | 9/2000 | Weck | ............ 370/203 |
| 6,157,616 A | * | 12/2000 | Whitehead | ............ 370/252 |
| 6,804,206 B1 | * | 10/2004 | Moulsley | ............ 370/320 |
| 7,403,539 B1 | | 7/2008 | Tang et al. | |
| 2003/0097467 A1 | * | 5/2003 | Sano | ............ 709/238 |
| 2004/0161046 A1 | * | 8/2004 | Schott et al. | ............ 375/260 |
| 2009/0034558 A1 | * | 2/2009 | Mudulodu et al. | ............ 370/512 |

* cited by examiner

*Primary Examiner* — Michael Neff
(74) *Attorney, Agent, or Firm* — Edell, Shapiro & Finnan, LLC

(57) ABSTRACT

A mid-packet detection technique is provided that detects a packet with periodic repetitions of a fixed duration at a point in time of the packet other than a start-of-packet pattern, e.g., a preamble, associated with the packet. The process performs packet detection without detecting a preamble and does not require carrier frequency recovery, timing recovery (synchronization) or channel estimation. In one embodiment, a doubly differential matched filter autocorrelation of the received signal is computed and used as a metric for packet detection when the preamble is not observed or to complement preamble detection. The metric is compared to a threshold to indicate detection of a packet.

24 Claims, 7 Drawing Sheets

MID-PACKET CLEAR CHANNEL ASSESSMENT

TECHNICAL FIELD

The present disclosure generally relates to communication technology, and in particular to detecting presence of transmissions on a communication channel.

BACKGROUND

In certain wireless communication systems, multiple devices share access to the wireless communication medium, e.g., radio frequency (RF) channel or channels. Numerous communication protocols have been developed to control how devices access the medium. One technique that is common among many communication protocols is to detect the presence of a transmission from another communication device before a device initiates its own transmission on the medium. Transmissions are formatted as packets or frames, where an initial portion of the packet or frame comprises a start-of-packet pattern often referred to as a preamble. The data or payload of the packet follows the preamble.

It is common practice to configure communication devices to detect a packet or frame associated with a transmission on the communication channel by identifying the preamble associated with the packet. For example, received signal strength indicators, changes in energy, and auto- and cross-correlation functions are examples of techniques to detect a preamble. However it is not always possible for a device to observe the preamble (e.g., due to a collision of one or more packets or shutting down during a power save mode), and in fact the first observation that a communication device makes may comprise portions of a packet or frame that follow the preamble (e.g., data symbol) in which case the ability to detect a preamble alone is not a sufficient packet detection technique. In many cases, a communication device fails to see the transmission of a packet in the absence of detecting the preamble, except when an energy detection threshold is set to a relatively low value, in which case, false positive packet detections may occur.

A technique that allows a communication device to detect an in-progress packet without requiring detection of a start-of-packet pattern, e.g., a preamble, would be very helpful in improving performance of communication devices and the systems or networks in which the communication devices operate.

DESCRIPTION OF EXAMPLE EMBODIMENTS

Overview

Techniques are provided herein for a packet detection scheme that is useful when the preamble or other start-of-packet (SOP) pattern or field is not observed. According to the technique, energy is received in a frequency band and a receive signal is produced that represents the received energy. The receive signal is analyzed to detect a packet associated with a transmission by a communication device at a point in time other than a preamble pattern that is associated with the packet.

Figure 1:
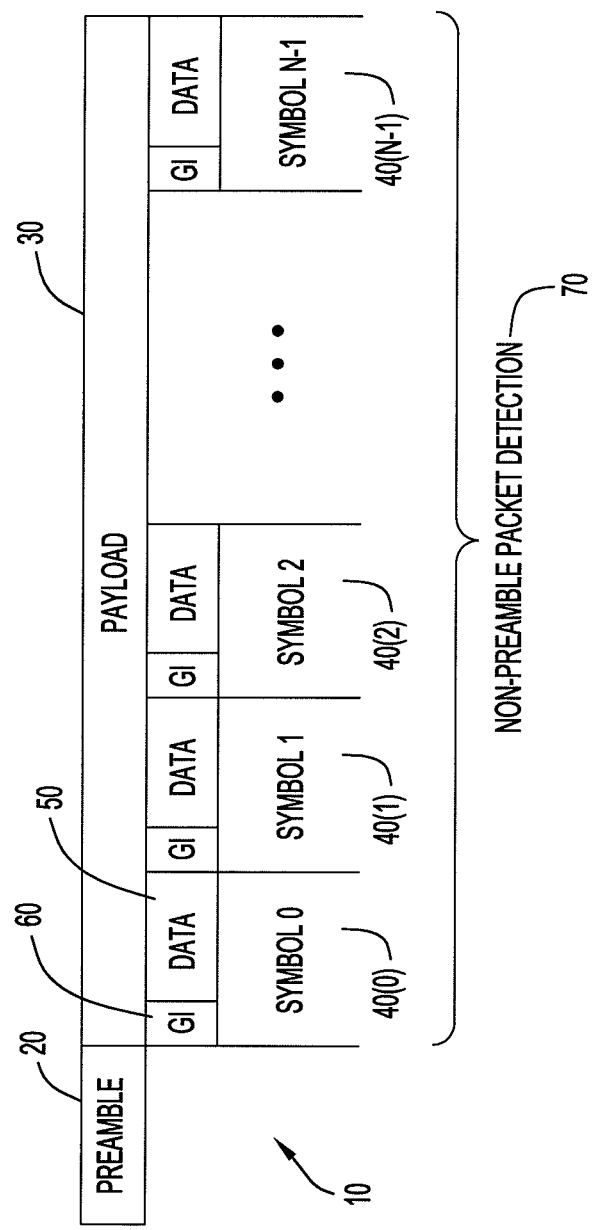
FIG. 1 is an example of a timing diagram of a packet or frame that is detected with the mid-packet detection process described herein.

Referring first to FIG. 1, an example of a packet or frame is shown at 10. The packet 10 is one example of a type of packet whose presence is to be detected using a mid-packet detection process described herein, and FIG. 1 is meant by way of example only. The packet 10 comprises a preamble 20 and a payload 30. The payload 30 further comprises a plurality of segments 40(0)-40(N−1) that occur at regular intervals throughout a duration of the packet. For example, each segment is a symbol, such as an orthogonal frequency division multiplexed (OFDM) symbol. Thus, segment 40(0) contains symbol 0, segment 40(1) contains symbol 1 and so on. Each of the segments 40(0)-40(N−1) comprises a data interval 50 and a guard interval (GI) 60. The segments occur at a regular interval referred to herein as a repetition period. That is, the duration of a segment (symbol) is the repetition period of the segments. While FIG. 1 shows that the GI 60 is at the start (also known as a cyclic prefix) of a segment, it may occur at the end (also known as a cyclic postfix) of a segment. The GI 60 is provided to avoid inter-symbol interference and thereby reduce error rate caused by multipath effects. For example, in the IEEE 802.11n communication standard, the duration of the GI is 800 ns (referred to as a "long" GI) or 400 ns (referred to as a "short" GI) and appears at the start of each OFDM symbol transmitted in the corresponding packet and therefore possesses a desirable property that can be used to detect OFDM symbol transmissions indicative of a packet.

A packet containing OFDM symbols is one example of a packet for which the mid-packet detection technique is useful as described herein. An OFDM symbol appears as Gaussian noise yet it can be identified by its regular cyclic extension. As mentioned above, a cyclic prefix is a repeat of a portion (e.g., the start) of the data part of an OFDM symbol. The GI allows multipath effects of the channel to settle before each data portion of an OFDM symbol arrives at the receiver. Thus, the mid-packet detection process described herein uses the cyclic prefix extension of a symbol, e.g., an OFDM symbol, in order detect a packet at a point in time other than occurrence of the preamble of the packet. This generally corresponds to the non-preamble packet detection time interval shown at reference numeral 70 in FIG. 1. More specifically, the mid-packet detection process analyzes the receive signal on the basis of the repetition period of the segments (symbols) and duration of the GI of the segments (symbols) in a packet of a type expected to be transmitted in a frequency band of interest.

Although the terms "OFDM symbol" and "prefix" are used herein, it is by way of example only and without any intention to limit the scope of the techniques described herein to OFDM symbols or prefix techniques. The techniques described herein may be used to detect any type of waveform that has portions with fixed durations and that periodically repeat throughout the duration of the waveform.

Figure 2:
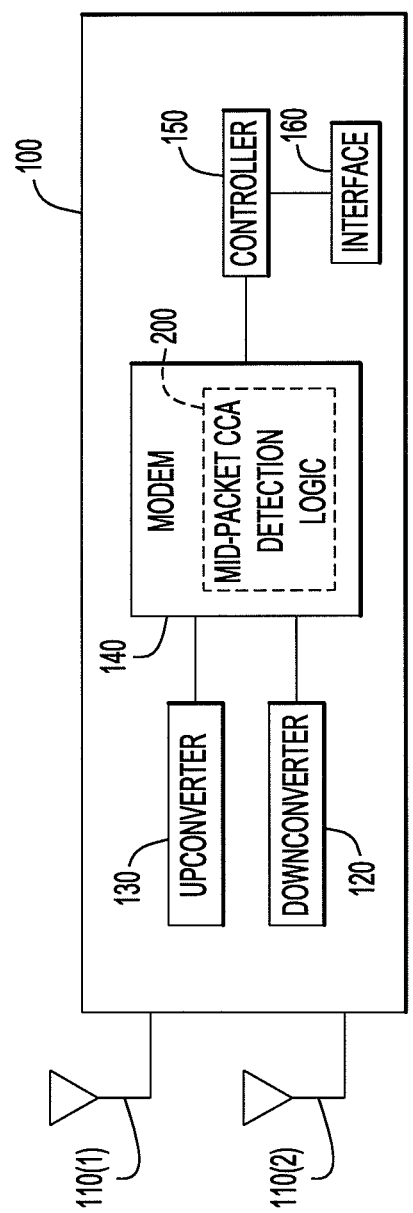
FIG. 2 is an example of a block diagram of a communication device that is configured to perform the mid-packet detection process.

FIG. 2 shows an example of a communication device 100 configured to perform the mid-packet detection process. The communication device 100 comprises two antennas 110(1) and 110(2), a downconverter 120, an upconverter 130, a modem 140 and a controller 150. The downconverter 120 is configured to produce receive signals from energy detected by antenna 110(1) and 110(2), respectively. In other embodiments, the communication device 100 may have 3, 4 or more antennas. The upconverter 130 is configured to make transmissions via one or both of the antennas 110(1) and 110(2) based on a transmit signal supplied to it by the modem 140. The modem 140 comprises mid-packet detection logic (e.g., hardware) 200 that performs the mid-packet detection process described herein. The controller 150 performs overall control functions of the communication device 100. It is to be understood that the downconverter 120 may actually comprise two separate downconverter circuit paths, one for each of the antennas 110(1) and 110(2), but for simplicity, these individual downconverter circuit paths are not shown in FIG. 2. In other embodiments, the communication device 100 may have 3, 4 or more downconverter circuit paths according to the number of antennas. Likewise, the upconverter 130 may comprises separate upconverter circuit paths, one for each of the antennas 110(1) and 110(2), but for simplicity these individual upconverter circuit paths are not shown in FIG. 2. The communication device 100 further comprises an interface block 160 that is configured to interface signals from the device 100 to other devices or systems and from other devices or systems. For example, the interface block 160 may be component that implements the peripheral component interface (PCI) standard.

As indicated above, the mid-packet detection technique described herein detects a packet at a point in time of the packet other than a preamble that is associated with the packet and indicates the beginning of the packet. Packet detection without detecting a preamble need does not require carrier frequency recovery, timing recovery (synchronization) or channel estimation, since these are much more difficult signal processing tasks to perform in the absence of a preamble. The method, apparatus and logic described herein does not require carrier frequency recovery, timing recovery (synchronization) or channel estimation, and relies on regularly repeating segments within the packet waveform. In one embodiment, a doubly differential matched filter autocorrelation of the received signal is computed and used as a metric for packet detection when the preamble is not observed or to complement preamble detection. The metric is compared to a threshold, which when exceeded, indicates detection of a packet.

An example of the mid-packet detection logic 200 is now described with reference to FIG. 3. The mid-packet detection logic 200 comprises a first autocorrelation block 210, a matched filter block 220, a second autocorrelation block 230, an averaging block 240 and a normalizing and threshold comparison block 250. The output of the mid-packet detection logic 200 is at the normalizing and threshold comparison block 250. The output of conventional preamble-based detection logic 300 may be supplied together with the output of the mid-packet detection logic 200 to an OR gate block 310. The OR gate block 310 outputs a positive packet detection indicating that the channel is not clear for transmission, in other words a negative clear channel assessment (CCA) indication, when either the mid-packet detection logic 200 or the conventional preamble-based detection logic 300 generates an output indicating detection of a packet.

The first autocorrelation block 210 comprises delay and conjugate computation elements 212(1) and 212(2) and multiplier elements 214(1) and 214(2) for receive signals associated with antennas 110(1) and 110(2), respectively. An adder 216 is provided that adds the outputs from the multipliers 214(1) and 214(2). The delay and conjugate computation elements 212(1) and 212(2) delay the receive signals associated with antennas 110(1) and 110(2), respectively, by a delay amount corresponding to the duration of the data interval of a segment e.g., OFDM symbol (FIG. 1), and computes the conjugate of the delayed signal. The multiplier elements 214 (1) and 214(2) multiply the original receive signals at antennas 110(1) and 110(2) by the delayed and conjugated signals from elements 212(1) and 212(2), which are then supplied to the adder 216 that combines the two signals. Thus, the first autocorrelation block 210 comprises two autocorrelation modules, one for each of the receive signals associated with antennas 110(1) and 110(2), produces autocorrelation signals associated with each antenna path, combines the two autocorrelation signals and produces a first autocorrelation (vector) signal. In general, the number of autocorrelation signals produced in the first autocorrelation block 110 (to ultimately produce the first autocorrelation signal) corresponds to the number of downconverter circuits in the communication device.

The matched filter block 220 comprises a moving average computation module 222 that is configured to compute a moving average of the first autocorrelation signal, thereby serving as a matched filter of the various peaks in the first autocorrelation vector signal. In one embodiment, the moving average computation module is a matched filter with a rectangular impulse response of duration equal to the GI duration. The output of the matched filter block 220 is referred to herein as a peak matched filtered signal.

The second autocorrelation block 230 comprises a delay and conjugate computation element 232 and a multiplier element 234 that, in combination, serve as an autocorrelation module to compute the correlation between the original autocorrelation, that is, the peak matched filtered signal and a delayed version of the peak matched filter signal produced by the delay and conjugate computation element 232. The delay equals the duration of a segment (FIG. 1), e.g., an OFDM symbol duration. The output of the second autocorrelation block 230 is referred to as a second (doubly differential) autocorrelation signal.

The averaging block 240 computes averages at each downconverter sample time of the second (doubly differential) autocorrelation signal taken at OFDM symbol periods over several OFDM symbol periods and produces an average signal. Said another way, the averaging block 240 computes an average of the second autocorrelation signal over a plurality of segment intervals to output an average signal comprising peaks that regularly occur at a time interval corresponding to the repetition period of the segments. Though there is only one peak per repetition period in the averaged signal, the average signal is like a moving average. The average signal is continuously updated with the incoming received signal. As more and more symbols are contained in the received signal over time, the peaks are averaged over a sliding window consisting of 4-5 symbols, for example. As a result, the output average signal comprises peaks that regularly occur at time intervals corresponding to the repetition period.

The normalizing and threshold comparison block 250 normalizes the average signal to account for amplitude variations of the average signal due to different packet transmissions, imperfect automatic gain control (AGC), noise, etc. For example, the average signal may be normalized by computing the root mean squared (RMS) average of all averages computed by the averaging block 240 over the previous OFDM symbol period and then dividing the average signal by the RMS average to produce a normalized average signal. Then, block 250 compares the maximum, e.g., peak, of a real part of the normalized average signal to a threshold to determine whether a packet is present on the channel. The threshold is, for example, a threshold in dBm. When the maximum or peak of the normalized average signal exceeds the threshold, the block 250 generates an output to indicate presence of a packet, such as a high (logic "1") output.

More generally, the normalizing and threshold comparison bock 250 compares a magnitude of peaks in the average signal (produced by the averaging block 240) with a threshold and generates an output indicating detection of a packet when the magnitude of any one of the peaks exceeds the threshold.

Figure 3:
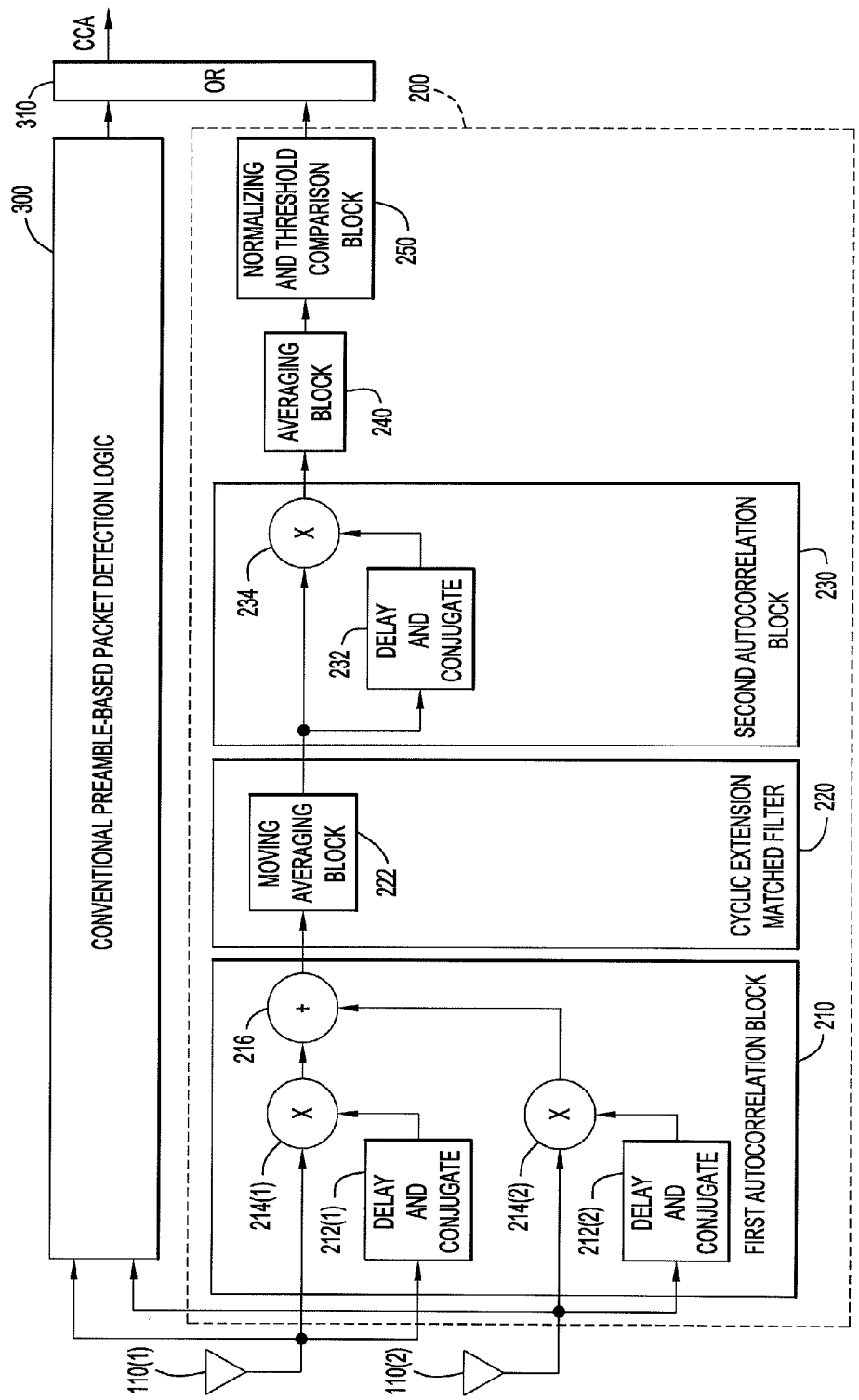
FIG. 3 is block diagram showing an example of hardware logic that is configured to perform the mid-packet detection process.
Figure 4:
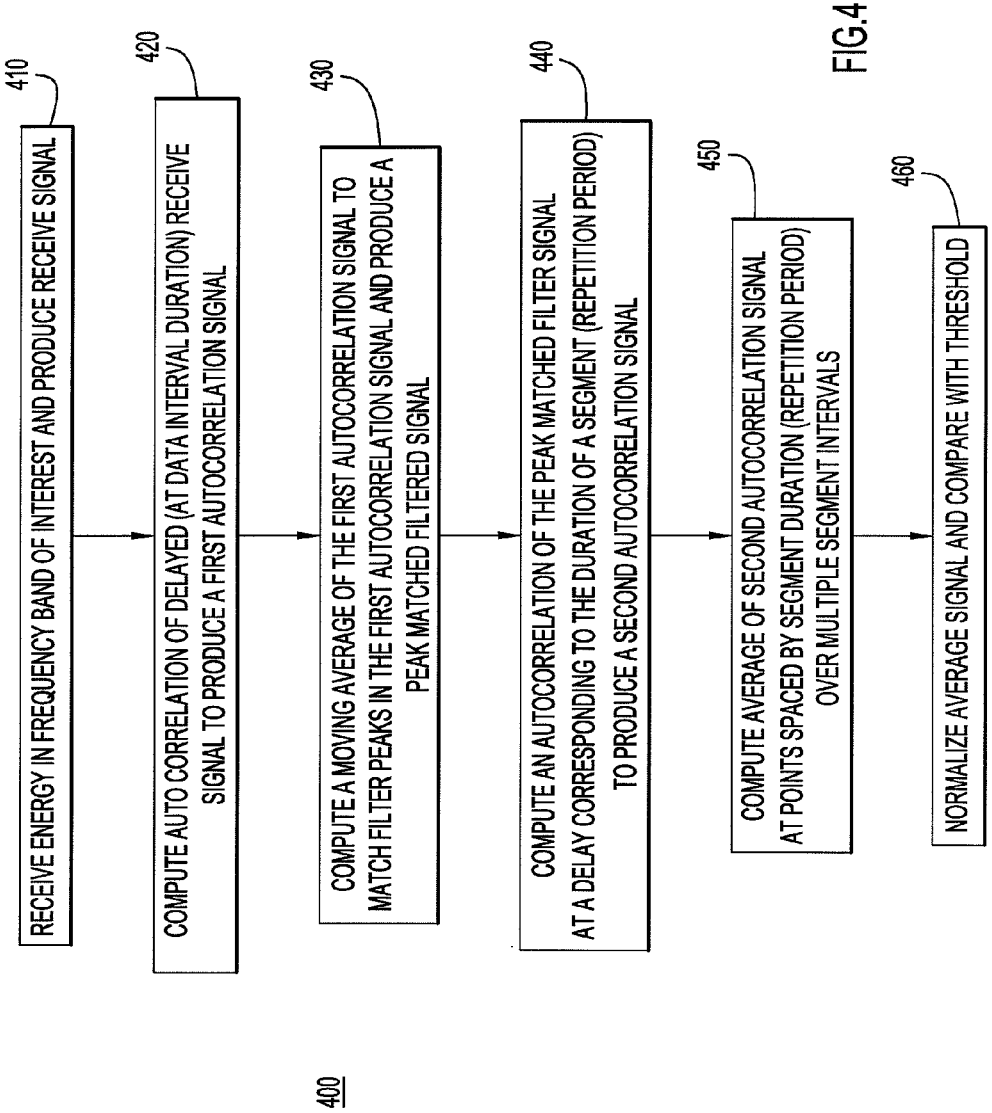
FIG. 4 is a flow chart depicting the mid-packet detection process.

A mid-packet detection process is now described in conjunction with FIG. 4 and FIGS. 5-10. The mid-packet detection process, shown generally at 400 in FIG. 4, represents one example of the operation of the logic 200 shown in FIG. 3 and described above. FIGS. 5-10 illustrate plots of signals at the various stages of the mid-packet detection process 400, and corresponding to the signals referred to above in the description of FIG. 3.

Figure 5:
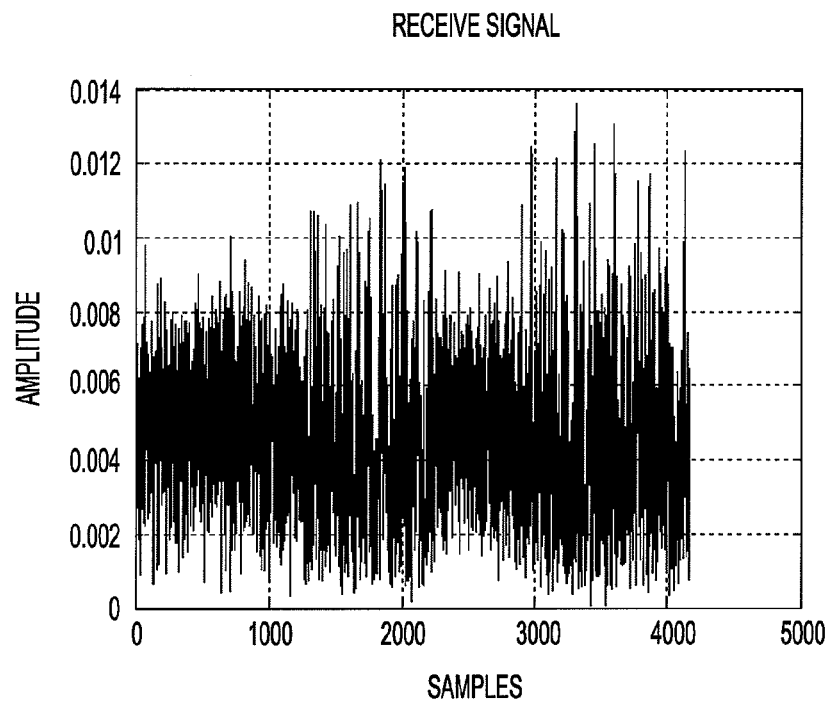
FIG. 5 is an example of a plot of a receive signal that is analyzed using the mid-packet detection process.

At 410, energy is received in the frequency band (e.g., channel) of interest and a receive signal is produced that represents the received or detected energy. This is a function performed by the receiver 120. FIG. 5 illustrates an example of a plot of the receive signal, and in particular a signal that has been transmitted in accordance with the IEEE 802.11n communication standard.

Figure 6:
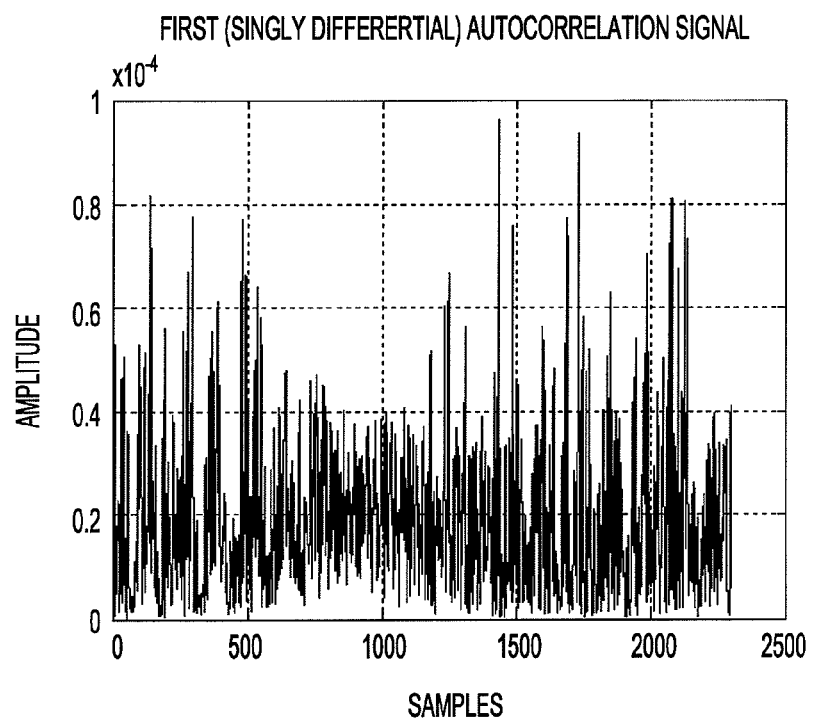
FIG. 6 is an example of a plot of a first autocorrelation signal produced by the mid-packet detection process from the receive signal shown in FIG. 5.

Next at 420, the receive signal is delayed by an amount equal to the duration of the data interval of an segment (e.g., OFDM symbol) of a type of packet expected to occur in the frequency band of interest, and an autocorrelation of the delayed receive signal is computed to produce a first autocorrelation signal. In the example of the mid-packet detection logic shown in FIG. 3, this function is performed for the receive signal associated with each of the antenna paths. An example of a plot of the first (singly differential) autocorrelation signal computed from the receive signal shown in FIG. 5 is shown in FIG. 6. The first (singly differential) autocorrelation signal can contain numerous peaks due to the nature of the modulated waveform (e.g. an OFDM symbol is Gaussian-like due to its many subcarriers).

Figure 7:
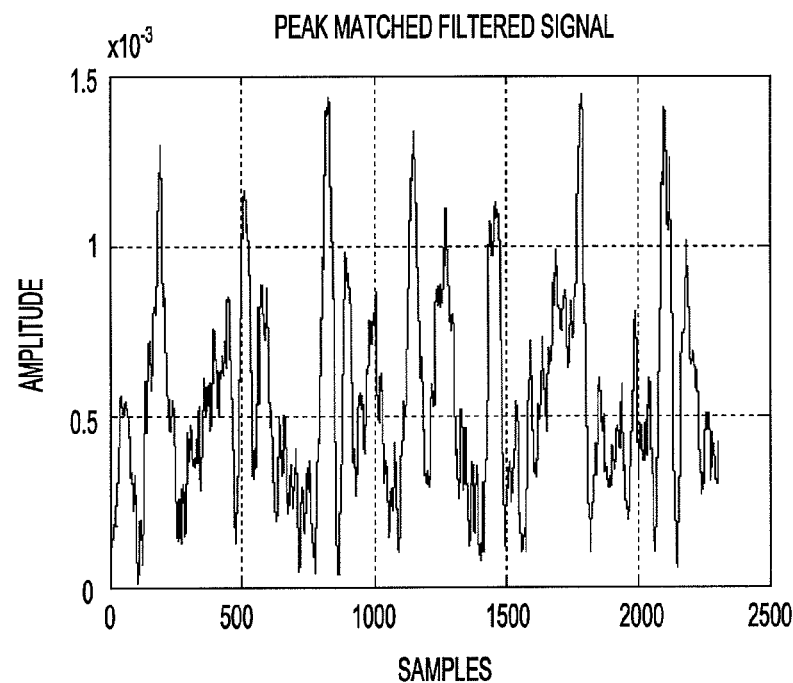
FIG. 7 is an example of a plot of a peak matched filtered signal produced by the mid-packet detection process from the first autocorrelation signal shown in FIG. 6.

At 430, a moving average of the first autocorrelation signal is computed to match filter the peaks in the first autocorrelation signal that arise from the duration of the GIs in a packet, thereby producing a peak matched filtered signal. The moving average function gathers the numerous peaks that the first autocorrelation signal may contain. FIG. 7 illustrates an example of a plot of a peak matched filtered signal that is computed for the first autocorrelation signal shown in FIG. 6.

Figure 8:
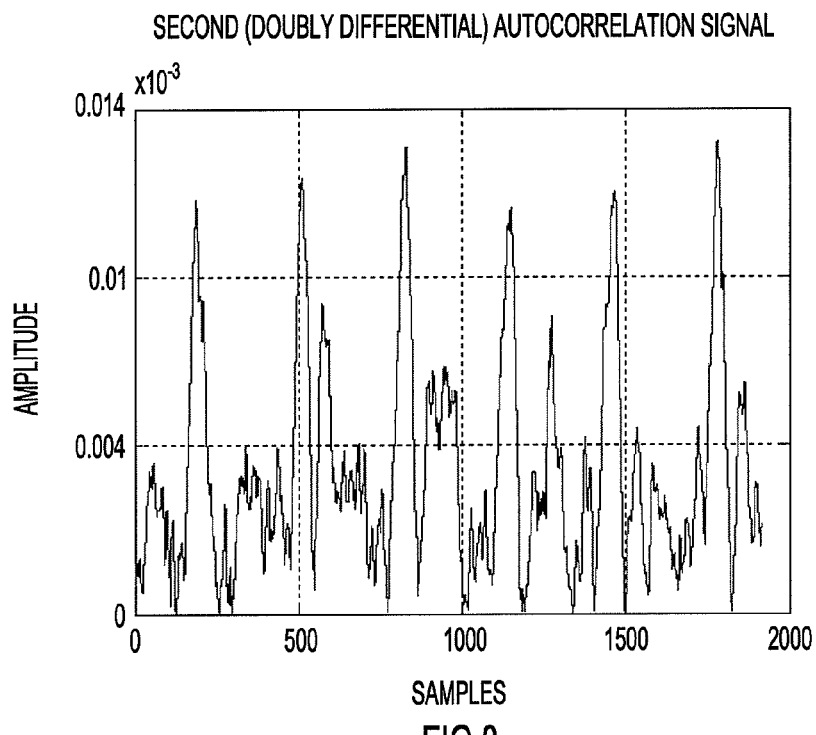
FIG. 8 is an example of a plot of a second autocorrelation signal produced by the mid-packet detection process from the peak matched filtered signal shown in FIG. 7.
Figure 9:
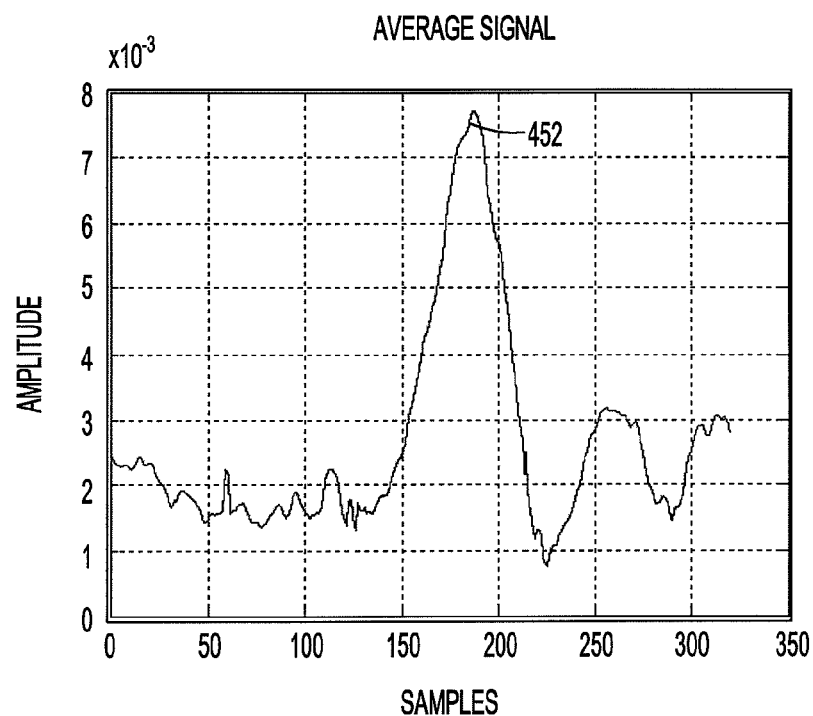
FIG. 9 is an example of a plot of an average signal produced from the second autocorrelation signal shown in FIG. 8.

At 440, an autocorrelation of the matched filtered signal is computed at a delay corresponding to the repetition period of the segments (symbols) to produce a second (doubly differential) autocorrelation signal. In the ideal case (noiseless, perfect AGC), the maximum value of the first autocorrelation should be purely real in the presence of a packet. However, carrier frequency offsets of transmitted packets can drastically affect this peak because of considerable phase changes induced onto the signal. The second autocorrelation signal compensates for the effects of carrier frequency offsets of transmitted packets. FIG. 8 illustrates an example of a plot of the second autocorrelation signal derived from the peak matched filtered signal shown in FIG. 7. The larger peaks shown in FIG. 8 correspond to individual OFDM symbols in the receive signal. The occurrence of these peaks at a regular spacing (time interval between peaks) is indicative of the occurrence of OFDM symbols in the receive signal. In fact, the spacing between peaks corresponds to an OFDM symbol period At 450, an average of the second autocorrelation signal is computed at OFDM-symbol-spaced points over multiple OFDM symbol intervals to produce an average signal that contains a single pulse when the second autocorrelation signal comprises peaks that regularly occur at a time interval corresponding to a duration of a packet. For example, the average may be computed over 4-8 packet intervals. FIG. 9 shows an example of an average signal derived from the second autocorrelation signal shown in FIG. 8. A single relatively strong peak in the average signal is shown at reference numeral 452 in FIG. 9. At this point, detection of an in-progress packet can be made by comparing a magnitude of any pulse in the average signal with a threshold and generating an output indicating detection (presence) of a packet in the receive signal when the strength of the any pulse in the average signal exceeds the threshold. However, to account for noise and imperfect AGC, multiple packets transmitted with at least some partial overlap in time, etc., the average signal can be normalized before compared with a threshold.

Again, said another way, the averaging function at 450 involves computing an average of the second autocorrelation signal at points spaced by a period of time corresponding to the repetition period and over a plurality of segment intervals to output an average signal comprising peaks that regularly occur at a time interval corresponding to the repetition period.

Figure 10:
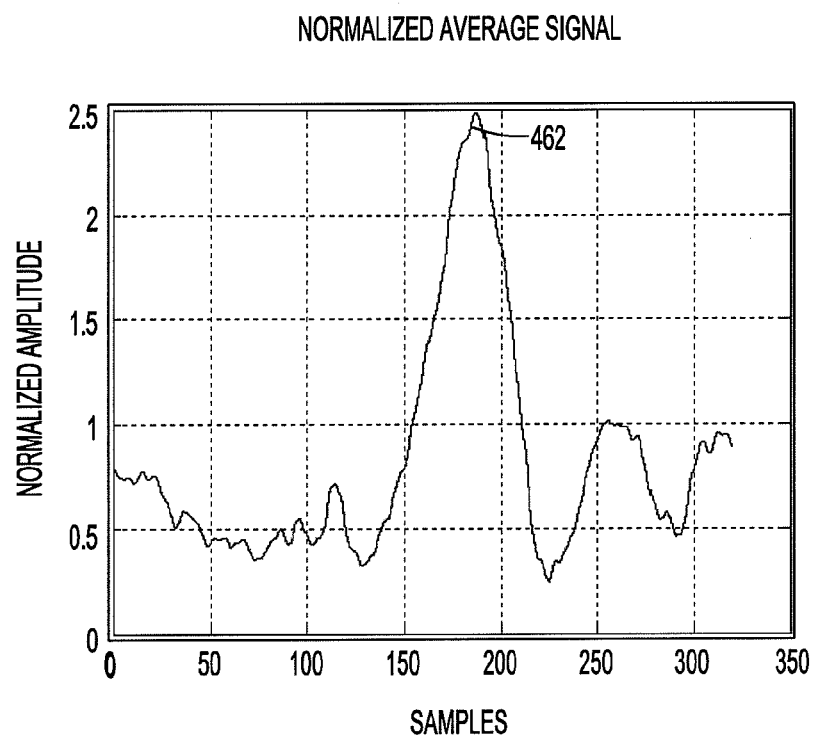
FIG. 10 is an example of a plot of a normalized average signal produced from the average signal shown in FIG. 9.

At 460, the average signal is normalized to produce a normalized average signal. The real part of the normalized average signal is compared to a threshold and if it exceeds the threshold, an output is generated that indicates a packet is present in the received signal. FIG. 10 illustrates a plot as an example of a normalized average signal for the average signal shown in FIG. 9. The peak shown at 462 in FIG. 10 corresponds to the peak 452 in FIG. 9, but normalized. A single strong peak in the normalized average signal is indicative of the presence of a packet in the receive signal.

The mid-packet detection technique described herein is flexible to detect packets having different GI durations (e.g. long or short as defined in IEEE 802.11n) by deploying different instances of the hardware shown in FIG. 3 with different delays and averaging periods (and impulse responses) tuned to each set of OFDM symbol and GI durations. The average over the number of packet (symbol) periods can be set as a variable parameter depending in the particular application. In addition, the threshold for packet detection can be set based on observed, theoretical and simulation results to make the technique more robust.

While the foregoing description and accompanying drawings refer to a hardware implementation of the mid-packet detection techniques, it may be implemented in software stored in a readable memory, and that is executed by a processor (e.g., controller 150 shown in FIG. 2) in a communication device.

There are a number of situations where the ability to detect in-progress packets or frames (i.e., beyond the time interval during which the preamble is transmitted) is important. The following are examples of these situations.

Radar detection. In certain frequency bands, radar systems and devices are given priority as to usage of the frequency band over other devices. Thus, when a radar system is detected, the other non-radar users of that frequency band refrain from transmitting for a certain period of time. One problem that some communication devices have is false detection of radar systems. Often this false detection is due to collision (in time and frequency) of multiple packets. The preambles of the multiple packets are lost, but the energy in the colliding packets has a strong resemblance to criteria used for detecting radar pulses, thereby causing the communication device to falsely detect the overlap of multiple packets as a radar system. This in turn causes the communication device to unnecessarily switch to a different channel. Switching channels causes delays that can drastically affect the performance (speed, time, and power) of the communication device. Thus, the techniques described herein can analyze a receive signal to distinguish occurrence of at least one packet (e.g., packet collisions) from occurrence of pulses of radar transmissions in a frequency band, and thus reduce the incidence of false radar detection in communication devices.

Legacy coexistence. Communication standards evolve over time to improve performance and offer new features. In so doing, it is necessary to account for the operation of legacy devices that operate in accordance with earlier or older versions of the communication standard. For example, devices configured to operate in accordance with the IEEE 802.11n communication standard may operate in a wider bandwidth mode, e.g., 40 MHz, whereas devices that operate in accordance with earlier versions of the IEEE 802.11 standard operate in a standard bandwidth mode, 20 MHz, which can overlap with the bandwidth of a device in the wider bandwidth mode. The devices that have the wider bandwidth mode capability need to check for legacy devices. These situations can arise when a legacy device is in the middle of a packet transmission in which case the wider bandwidth mode device will not detect the preamble associated with that packet at the time it looks for activity on the channel since the preamble has already been transmitted (i.e., it is mid-packet). Without detecting the preamble, the wider bandwidth mode device would fail to detect the legacy device and continue with its transmission in its wider bandwidth mode which would overlap with the channel in which the legacy device is operating. As a result, there will be numerous packet collisions that greatly degrade the throughput of the devices operating on that channel. The mid-packet detection techniques described herein will allow for a more precise and robust clear channel assessment (CCA) algorithm to better allow for coexistence of devices in the scenario described above. For example, the mid-packet detection techniques may detect an in-progress packet transmitted by a communication device in a particular frequency channel within a frequency band of interest so that the communication device refrains from making a transmission in the particular frequency channel. The logic to control the communication device to refrain from making the transmission may reside in the modem 140 or controller 150 as shown in FIG. 2. In the case where the communication device has wideband communication capabilities (i.e., a transmission within multiple frequency channels combined together), the communication device may be configured (via logic in its modem or controller) to refrain from making a transmission when it detects a packet in a particular frequency channel that is one of the multiple frequency channels that it uses for wideband transmissions.

Power savings for low-power devices. Many low-power communication devices go into a sleep mode to conserve power. When the device goes active again to make transmissions on a channel, other devices might be in the middle of their packet transmission. The mid-packet detection scheme described herein can be used to detect in-progress packets so that the device can conserve power by waiting until the channel is clear (packet transmissions have been completed) rather than transmitting the packet while a packet has already begun transmission by another device, losing the packet, and consequently re-transmitting the packet due to the collision with the packet transmission in-progress from another device. Thus, the controller 150 of a communication device may be configured to defer transmission after the communication wakes up and detects an in-progress packet.

Dual-mode devices. Some communication devices are equipped to operate using multiple communication standards, for example, IEEE 802.11 and the Bluetooth™ communication standard. The mid-packet detection technique described herein can be used to optimize near-simultaneous packet transfers to/from a dual mode IEEE 802.11 and Bluetooth device. In particular, the mid-packet detection technique can assist the device in the IEEE 802.11 mode in detecting in-progress packets and relearning the idle or busy state of the channel after an absence due to transmitting or receiving a Bluetooth packet.

Furthermore, the mid-packet detection techniques may be used to enhance the performance of SOP detection, e.g., preamble detection, when used in conjunction with existing SOP detection methods, by serving as a confidence measure for current SOP detection schemes.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving energy in a frequency band and producing a receive signal representative thereof;
   analyzing the receive signal to detect occurrence of a packet associated with a transmission by a communication device at a point in time during a payload portion of the packet, wherein the payload portion of the packet comprises a plurality of segments that occur at regular intervals throughout a duration of the packet and each of the segments comprises a first portion and a second portion that contains and repeats part of the first portion, and wherein analyzing is based on a repetition period of the segments and a duration of the second portion of the segments of the packet and comprises computing a metric representing a doubly differential matched filter autocorrelation of the receive signal and comparing the metric with a threshold, which when exceeded, indicates presence of a packet in the receive signal; and
   detecting an in-progress packet transmitted by the communication device in a particular frequency channel within the frequency band based on said analyzing.

2. The method of claim 1, wherein the first portion comprises a data interval containing data and the second portion comprises a guard interval that includes a cyclic extension that repeats a portion of the data contained in the data interval, and wherein analyzing is based on the repetition period of the segments and a duration of the guard interval of the segments of the packet.

3. The method of claim 2, wherein analyzing comprises:
   delaying the receive signal by an amount equal to a duration of the data interval to produce a delayed receive signal;
   computing an autocorrelation of the delayed receive signal to produce a first autocorrelation signal;
   computing a moving average of the first autocorrelation signal to match filter peaks that may be contained in the first autocorrelation signal arising from the duration of the guard interval and produce a peak matched filtered signal representative thereof;
   computing an autocorrelation of the peak matched filtered signal at a delay corresponding to the repetition period of the segments to produce a second autocorrelation signal;
   computing an average of the second autocorrelation signal at points spaced by a period of time corresponding to the repetition period and over a plurality of segment intervals to output an average signal comprising peaks that regularly occur at a time interval corresponding to the repetition period; and
   comparing a magnitude of the peaks in the average signal with a threshold and generating an output indicating detection of a packet when the magnitude of any one of the peaks exceeds the threshold.

4. The method of claim 3, and further comprising normalizing the average signal to produce a normalized average signal, and wherein comparing comprises comparing a real part of the normalized average signal with a threshold.

5. The method of claim 1, wherein the first portion comprises one of a cyclic prefix and a cyclic postfix, and wherein analyzing comprises analyzing the receive signal to detect one of the cyclic prefix and cyclic postfix of the packet.

6. A method comprising:
   receiving energy in a frequency band and producing a receive signal representative thereof;
   analyzing the receive signal to detect occurrence of a packet associated with a transmission by a communication device at a point in time during a payload portion of the packet, wherein the payload portion of the packet comprises a plurality of segments that occur at regular intervals throughout a duration of the packet and each of the segments comprises a first portion and a second portion that contains and repeats part of the first portion, wherein the first portion comprises a data interval containing data and the second portion comprises a guard interval that includes a cyclic extension that repeats a portion of the data contained in the data interval, wherein analyzing is based on the repetition period of the segments and a duration of the guard interval of the segments of the packet by:
      delaying the receive signal by an amount equal to a duration of the data interval to produce a delayed receive signal;
      computing an autocorrelation of the delayed receive signal to produce a first autocorrelation signal;
      computing a moving average of the first autocorrelation signal to match filter peaks that may be contained in the first autocorrelation signal arising from the duration of the guard interval and produce a peak matched filtered signal representative thereof;
      computing an autocorrelation of the peak matched filtered signal at a delay corresponding to the repetition period of the segments to produce a second autocorrelation signal;
      computing an average of the second autocorrelation signal at points spaced by a period of time corresponding to the repetition period and over a plurality of segment intervals to output an average signal comprising peaks that regularly occur at a time interval corresponding to the repetition period; and
      comparing a magnitude of the peaks in the average signal with a threshold and generating an output indicating detection of a packet when the magnitude of any one of the peaks exceeds the threshold;
   detecting an in-progress packet transmitted by the communication device in a particular frequency channel within the frequency band based on said analyzing.

7. The method of claim 6, wherein analyzing comprises analyzing the receive signal to distinguish occurrence of at least one packet from occurrence of pulses associated with radar transmissions in the frequency band.

8. The method of claim 6, and further comprising refraining from making a transmission in the particular frequency channel based on said detecting.

9. The method of claim 8, wherein refraining comprises refraining from making a transmission that occupies multiple frequency channels combined together, wherein the multiple frequency channels includes the particular channel.

10. The method of claim 6, and further comprising deferring a transmission after wake up and detection of an in-progress packet based on said analyzing.

11. An apparatus comprising:
    a receiver that is configured to produce a receive signal from detected energy in a frequency band;
    a modem coupled to the receiver, wherein the modem is configured to analyze the receive signal to detect occurrence of a packet associated with a transmission by a communication device at a point in time during a payload portion of the packet; and
    a transmitter coupled to the modem, wherein the transmitter is configured to make a transmission based on a transmit signal received from the modem;
    wherein the modem is configured to detect an in-progress packet transmitted by the communication device in a particular frequency channel within the frequency band, wherein the payload portion of the packet comprises a plurality of segments that occur at regular intervals throughout a duration of the packet and each of the segments comprises a first portion and a second portion that contains and repeats part of the first portion, and wherein the modem is configured to analyze the received signal based on a repetition period of the segments and a duration of the second portion of the segments of the packet by computing a metric representing a doubly differential matched filter autocorrelation from the receive signal and comparing the metric to a threshold, which when exceeded, indicates presence of a packet in the receive signal.

12. The apparatus of claim 11, wherein the first portion comprises a data interval containing data and the second portion comprises a guard interval that includes a cyclic extension that repeats a portion of the data contained in the data interval, and wherein the modem is configured to analyze the receive signal on the basis of the repetition period of the segments and a duration of the guard interval of the segments of the packet.

13. The apparatus of claim 12, wherein the modem is configured to analyze the receive signal by:
  delaying the receive signal by an amount equal to a duration of the data interval to produce a delayed receive signal;
  computing an autocorrelation of the delayed receive signal to produce a first autocorrelation signal;
  computing a moving average of the first autocorrelation signal to match filter peaks that may be contained in the first autocorrelation signal arising from the duration of the guard interval and produce a peak matched filtered signal representative thereof;
  computing an autocorrelation of the peak matched filtered signal at a delay corresponding to the repetition period of the segments to produce a second autocorrelation signal;
  computing an average of the second autocorrelation signal at points spaced by a period of time corresponding to the repetition period and over a plurality of segment intervals to output an average signal comprising peaks that regularly occur at a time interval corresponding to the repetition period; and
  comparing a magnitude of the peaks in the average signal with a threshold and generating an output indicating detection of a packet when the magnitude of any one of the peaks exceeds the threshold.

14. The apparatus of claim 13, wherein the modem is further configured to normalize the average signal to produce a normalized average signal and to compare a real part of the normalized average signal with a threshold.

15. The apparatus of claim 11, wherein the modem is further configured to analyze the receive signal to distinguish occurrence of at least one packet from occurrence of pulses associated with radar transmissions in the frequency band.

16. The apparatus of claim 11, wherein the modem is configured to analyze the receive signal to detect one of the cyclic prefix and cyclic postfix of the packet.

17. An apparatus comprising:
  a receiver that is configured to produce a receive signal from detected energy in a frequency band;
  a modem coupled to the receiver, wherein the modem is configured to analyze the receive signal to detect occurrence of a packet associated with a transmission by a communication device at a point in time during a payload portion of the packet, wherein the payload portion of the packet comprises a plurality of segments that occur at regular intervals throughout a duration of the packet and each of the segments comprises a first portion and a second portion that contains and repeats part of the first portion, wherein the first portion comprises a data interval containing data and the second portion comprises a guard interval that includes a cyclic extension that repeats a portion of the data contained in the data interval, and wherein the modem is configured to analyze the receive signal on the basis of the repetition period of the segments and a duration of the guard interval of the segments of the packet by:
    delaying the receive signal by an amount equal to a duration of the data interval to produce a delayed receive signal;
    computing an autocorrelation of the delayed receive signal to produce a first autocorrelation signal;
    computing a moving average of the first autocorrelation signal to match filter peaks that may be contained in the first autocorrelation signal arising from the duration of the guard interval and produce a peak matched filtered signal representative thereof;
    computing an autocorrelation of the peak matched filtered signal at a delay corresponding to the repetition period of the segments to produce a second autocorrelation signal;
    computing an average of the second autocorrelation signal at points spaced by a period of time corresponding to the repetition period and over a plurality of segment intervals to output an average signal comprising peaks that regularly occur at a time interval corresponding to the repetition period; and
    comparing a magnitude of the peaks in the average signal with a threshold and generating an output indicating detection of a packet when the magnitude of any one of the peaks exceeds the threshold; and
  a transmitter coupled to the modem, wherein the transmitter is configured to make a transmission based on a transmit signal received from the modem;
  wherein the modem is configured to detect an in-progress packet transmitted by the communication device in a particular frequency channel within the frequency band.

18. The apparatus of claim 17, wherein the modem is configured to refrain from making a transmission that occupies multiple frequency channels combined together, wherein the multiple channels include the particular channel.

19. The apparatus of claim 17, and further comprising a controller coupled to the modem, wherein the controller is configured to defer a transmission after the apparatus wakes up and detects an in-progress packet.

20. The apparatus of claim 17, wherein the modem is further configured to refrain from making a transmission in the particular frequency channel when an in-progress packet is detected.

21. A non-transitory computer readable media storing software instructions for execution by a processor, and when executed operable to:
  analyze a receive signal derived from energy detected in a frequency band to detect occurrence of a packet associated with a transmission by a communication device at a point in time during a payload portion of the packet, wherein the instructions operable to analyze comprise instructions operable to compute a metric representing a doubly differential matched filter autocorrelation from the receive signal and to compare the metric to a threshold, which when exceeded, indicates presence of a packet in the receive signal; and
  detect an in-progress packet transmitted by the communication device in a particular frequency channel within the frequency band based on the analysis.

22. The non-transitory computer readable media of claim 21, wherein the payload portion of the packet comprises a plurality of segments that occur at regular intervals throughout a duration of the packet and each of the segments comprises a first portion and a second portion that contains and repeats part of the first portion, wherein the first portion comprises a data interval containing data and the second portion comprises a guard interval that includes a cyclic extension that repeats a portion of the data contained in the data interval, and wherein the instructions operable to analyze are based on the repetition period of the segments and a duration of the guard interval of the segments of the packet.

23. The non-transitory computer readable media of claim 22, wherein the instructions operable to analyze comprise instructions operable to:
  delay the receive signal by an amount equal to a duration of the data interval to produce a delayed receive signal;
  compute an autocorrelation of the delayed receive signal to produce a first autocorrelation signal;

compute a moving average of the first autocorrelation signal to match filter peaks that may be contained in the first autocorrelation signal arising from the duration of the guard interval and produce a peak matched filtered signal representative thereof;

compute an autocorrelation of the peak matched filtered signal at a delay corresponding to the repetition period of the segments to produce a second autocorrelation signal;

compute an average of the second autocorrelation signal at points spaced by a period of time corresponding to the repetition period and over a plurality of segment intervals to output an average signal comprising peaks that regularly occur at a time interval corresponding to the repetition period; and compare a magnitude of the peaks in the average signal with a threshold and generating an output indicating detection of a packet when the magnitude of any one of the peaks exceeds the threshold.

24. The non-transitory computer readable media of claim 23, and further comprising instructions operable to normalize the average signal to produce a normalized average signal and to compare a real part of the normalized average signal with a threshold.

* * * * *